United States Patent
Winkler et al.

(10) Patent No.: US 11,402,003 B2
(45) Date of Patent: Aug. 2, 2022

(54) SELF-ERECTING THREADED SPINDLE MODULE FOR A MOTOR VEHICLE BRAKE

(71) Applicant: Continental Teves AG & Co. OHG, Frankfurt am Main (DE)

(72) Inventors: Thomas Winkler, Mainz (DE); Lazar Milisic, Kelkheim/Taunus (DE); Thomas Hess, Seeheim-Jugenheim (DE); Mario Zach, Widnau (CH)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 16/983,643

(22) Filed: Aug. 3, 2020

(65) Prior Publication Data

US 2020/0362949 A1   Nov. 19, 2020

Related U.S. Application Data

(63) Continuation of application No. PCT/EP2019/053491, filed on Feb. 13, 2019.

(30) Foreign Application Priority Data

Feb. 16, 2018  (DE) .................... 10 2018 202 380.8
Jul. 13, 2018  (DE) .................... 10 2018 211 716.0

(51) Int. Cl.
*F16H 25/24*   (2006.01)
*B62D 65/12*   (2006.01)
(Continued)

(52) U.S. Cl.
CPC ............. *F16H 25/24* (2013.01); *B62D 65/12* (2013.01); *F16D 65/18* (2013.01); *F16D 2125/40* (2013.01); *F16H 2025/2445* (2013.01)

(58) Field of Classification Search
CPC ..... F16D 65/18; F16D 2125/40; B62D 65/12; F16H 25/24; F16H 2025/2445
See application file for complete search history.

(56) References Cited

U.S. PATENT DOCUMENTS

2009/0283371 A1   11/2009   Winkler et al.
2012/0079902 A1   4/2012    Osterlanger et al.
(Continued)

FOREIGN PATENT DOCUMENTS

DE          157819 A1     12/1982
DE    102010030277 A1 *   2/2011   ............. F16D 65/18
(Continued)

OTHER PUBLICATIONS

Search Report dated Mar. 12, 2019 from corresponding German Patent Application No. DE 10 2018 211 716.0.
(Continued)

*Primary Examiner* — Randell J Krug

(57) ABSTRACT

A threaded spindle module includes a threaded spindle which extends along a longitudinal axis and has an external thread at an output-side end and, offset with respect to the external thread, a drive-side end with a peg for rotationally fixed coupling to an actuator interface, and with a threaded nut which is screwed onto the external thread, and a joint-like curved support point of the threaded nut is provided as a pivot joint of the threaded spindle module, with a pivot joint center relative to an associated receiver.

11 Claims, 4 Drawing Sheets

(51) Int. Cl.
 *F16D 65/18* (2006.01)
 *F16D 125/40* (2012.01)

(56) References Cited

U.S. PATENT DOCUMENTS

2017/0217417 A1  8/2017 Baehrle-Miller et al.
2017/0370453 A1* 12/2017 Suzuki ................ F16H 25/2454

FOREIGN PATENT DOCUMENTS

| DE | 102010030277 A1 | 2/2011 |
| DE | 102009036884 A1 | 5/2011 |
| DE | 102013217237 A1 | 8/2015 |
| DE | 102015208165 A1 | 4/2016 |
| DE | 102014223021 A1 | 5/2016 |
| WO | 2008/037738 A1 | 4/2008 |

OTHER PUBLICATIONS

International Search Report and Written Opinion dated May 15, 2019 from corresponding International Patent Application No. PCT/EP2019/053491.

\* cited by examiner

SELF-ERECTING THREADED SPINDLE MODULE FOR A MOTOR VEHICLE BRAKE

CROSS REFERENCE TO RELATED APPLICATIONS

This application claims priority to PCT International Application No. PCT/EP2019/053491, filed Feb. 13, 2019, which claims priority to German Patent Application No. DE 10 2018 202 380.8, filed Feb. 16, 2018, and German Patent Application No. 10 2018 211 716.0, filed Jul. 13, 2018, wherein the contents of such applications are incorporated herein by reference.

TECHNICAL FIELD

A threaded spindle module for a motor vehicle brake.

TECHNICAL BACKGROUND

The threaded spindle module described may be regarded as an essential gear component of a wheel brake actuator, wherein the threaded spindle module is inserted vertically, in principle oriented coaxially and aligned, in a receiving cavity with receiving interface of a brake caliper housing, transport tray or similar, before the drive interface of the inserted threaded spindle module is rotationally fixedly coupled to a receiver in the actuator, and finally the actuator is flanged to the brake caliper housing so as to seal the cavity. Here, the important main task of the threaded spindle module in the actuator configuration is to convert a rotational drive motion of the actuator into a translational application movement of an application element, such as in particular a brake piston.

In particular with respect to the rational mass assembly of the described components in mass series production, the necessarily blind mounting (with visually completely concealed, concentric form-fit coupling, arranged at the correct angle and position, between the drive interface and the actuator output shaft interface or actuator counter-piece, without the possibility of visually detecting the position) has proved to be a particularly challenging task. The necessary alignment precision, and the necessarily disturbance-free, in particular vibration-free insertion between the components to be coupled in their pairing and completion of the blind mounting, can only be achieved with very great cost in the context of a mechanical mass production. The precision requirements imposed obstruct a fault-free and hence cost-controlled industrial value creation. Also, the known threaded spindle modules are designed such that, in response to a relatively slight excitation or mis-positioning, they skew to a maximum, i.e. aim to achieve a defective final position.

What is needed is to ensure as simple as possible an improvement in this disadvantageous starting configuration, such that in the described context a rational coupling is possible between the threaded spindle module and the actuator.

DETAILED DESCRIPTION OF THE EMBODIMENTS

Figure 1:
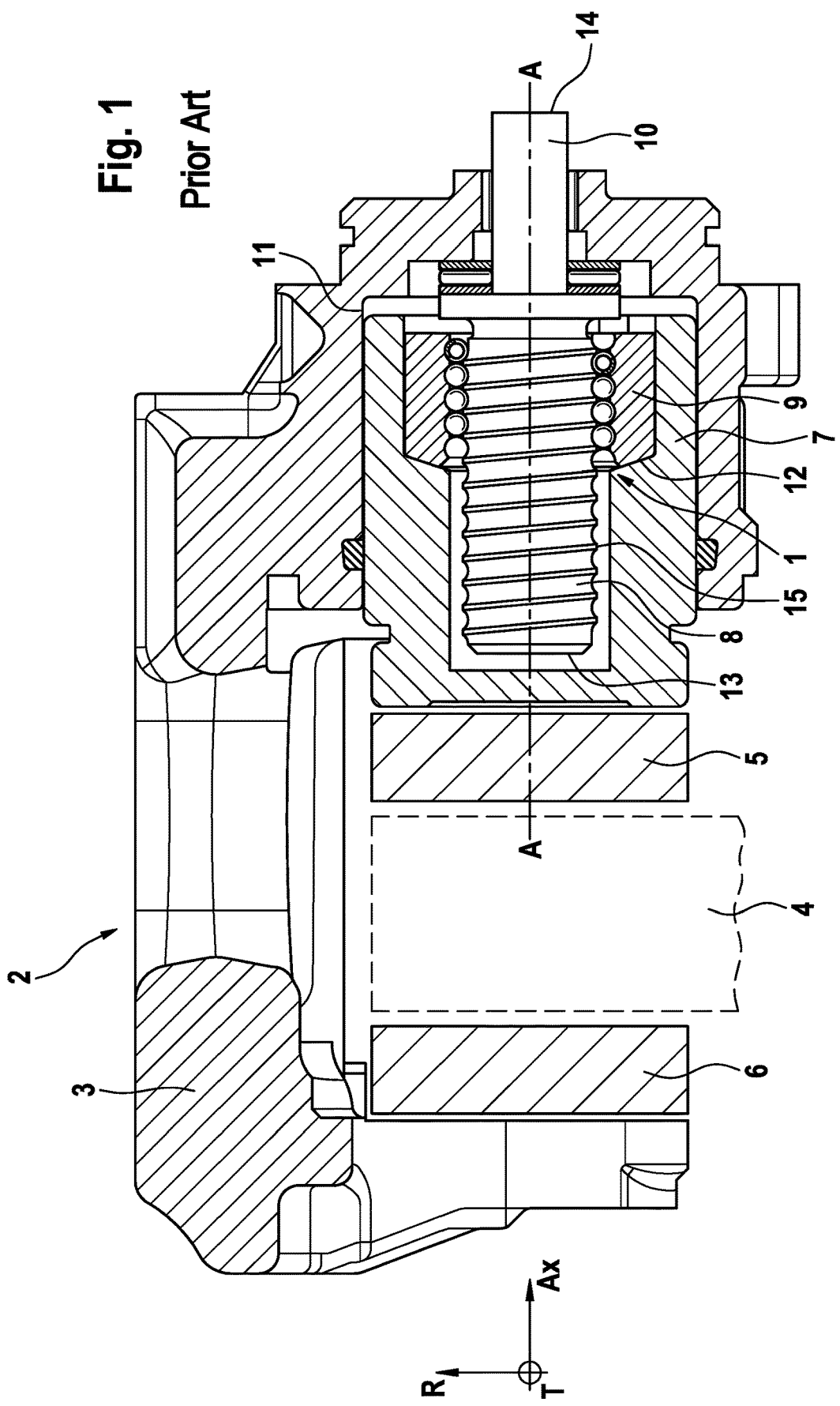
FIG. 1 shows a diagrammatic sectional depiction of a combined vehicle brake, comprising a hydraulically actuatable service brake with an electromechanically actuatable parking brake function, comprising a threaded spindle module in accordance with WO 2008/037738 A1.
Figure 2:
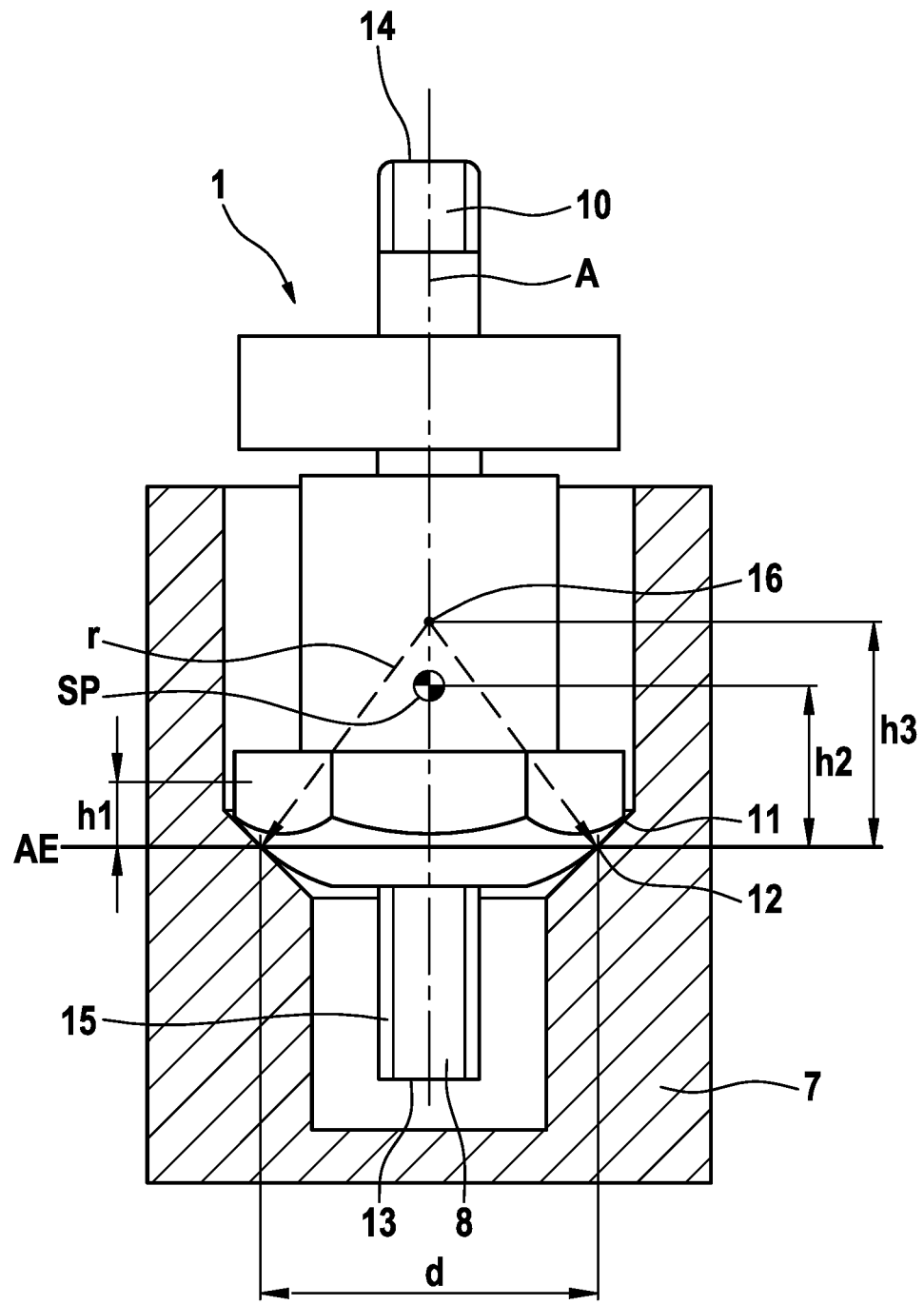
FIG. 2 shows diagrammatically a threaded spindle module in accordance with one or more embodiments.
Figure 3:
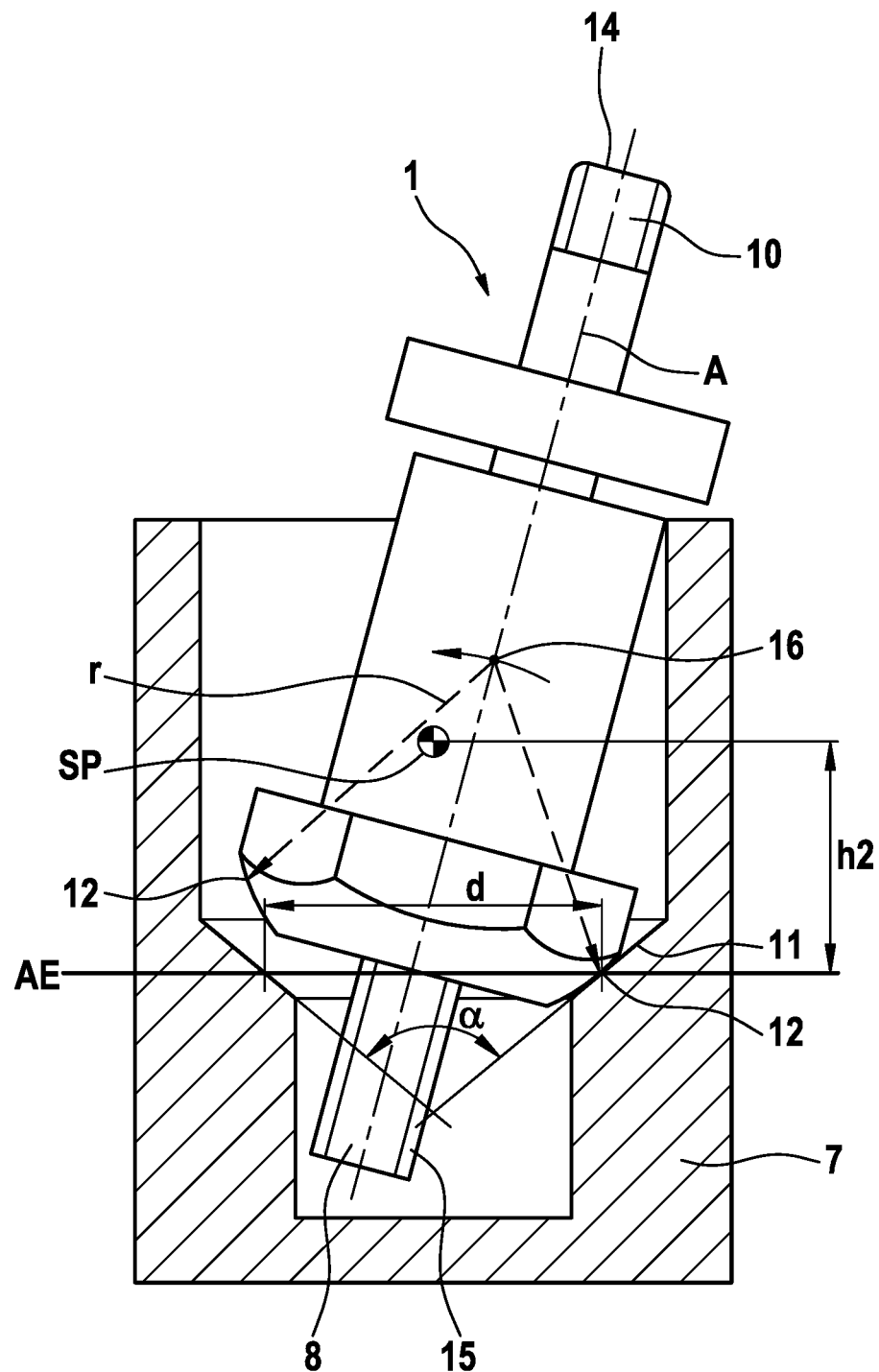
FIG. 3 shows diagrammatically an off-axis, skewed threaded spindle module, i.e. in incorrect mounting position in accordance with one or more embodiments.
Figure 4:
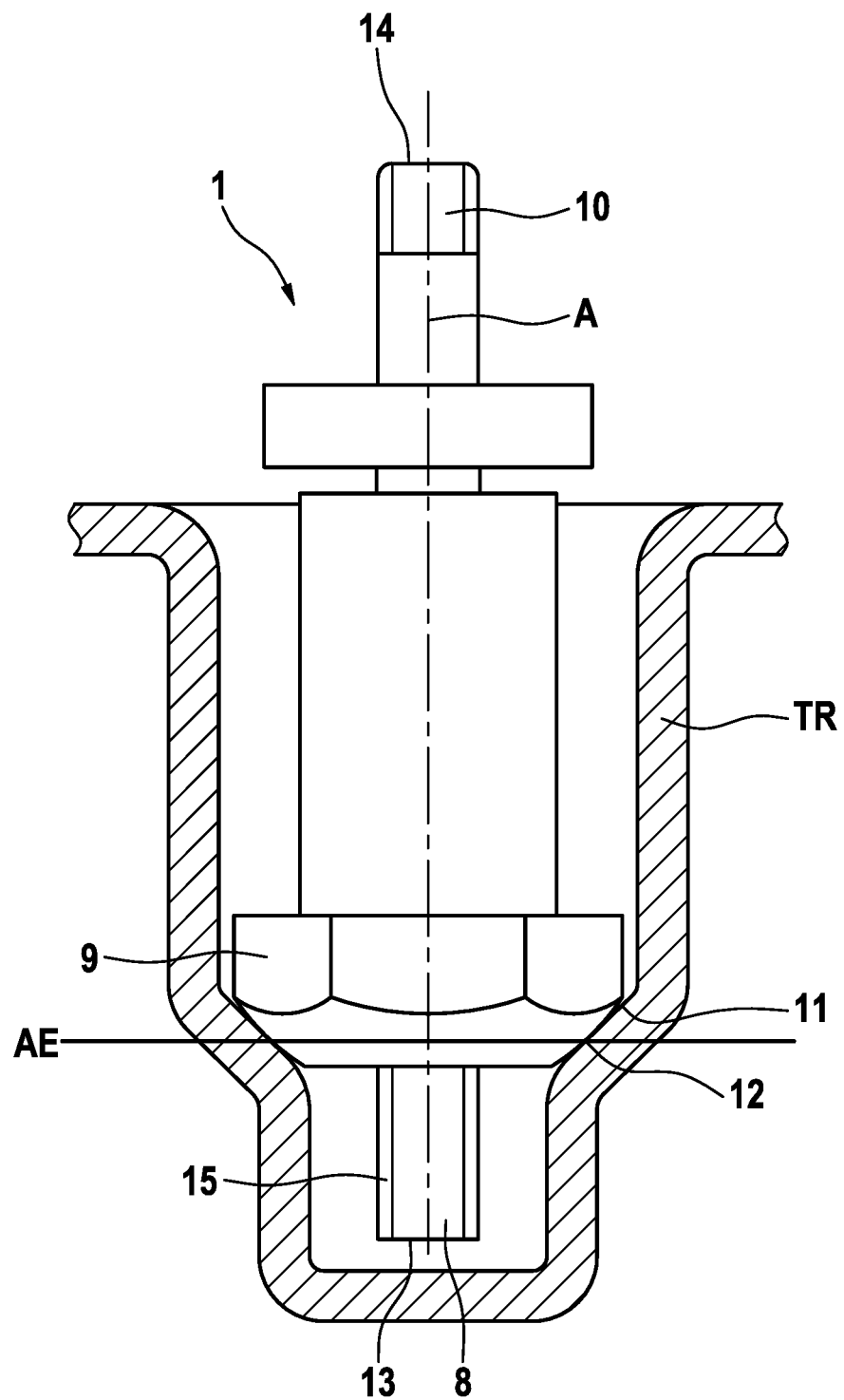
FIG. 4 shows a threaded spindle module in the correct mounting position in accordance with one or more embodiments.

The combined motor vehicle brake 2 shown in FIG. 1 comprises firstly a hydraulically actuatable service brake function and secondly an electromechanically actuatable parking brake device/function. The vehicle brake has a brake housing 3 which surrounds the outer edge of a brake disk 4 (indicated merely diagrammatically) and two brake pads 5, 6. On its inside, the brake housing 3 forms a brake cylinder which receives an axially movable brake piston 7. Brake fluid may be supplied to the service pressure chamber formed between the brake cylinder and the brake piston 7 for performance of service braking, so that a brake pressure builds up which shifts the brake piston 7 axially along the longitudinal axis A towards the brake disk 4. In this way, the brake pad 5 facing the brake piston 7 is pressed against the brake disk 4, wherein in reaction, the brake housing 3 shifts in the opposite direction and thereby presses the other brake pad 6 against the brake disk 4 (sliding caliper brake).

A parking brake device for performing parking brake processes can be actuated electromechanically and also acts as an actuator on the brake piston 7. A rotational-translational gear is provided which converts the rotational motion of an electromechanical actuator (not shown in detail) into a translational motion, and causes actuation of the brake piston along the longitudinal axis A. The gear is substantially formed by the threaded spindle module 1 which comprises a threaded spindle 8 with external thread 15, and a threaded nut 9 with internal thread, which may be connected together via roller bodies in a low-friction manner with self-inhibition or without self-inhibition. The roller bodies may be configured as balls. A peg 10 of the threaded spindle 8 protrudes from the brake housing 3 on the drive side and, when coupled via a rotationally fixedly co-operating actuator interface of a reduction gear (not shown), is driven by an electromechanical actuator (also not shown). The driving rotational motion transmitted to the threaded spindle 8 is converted into a translational motion by the threaded nut 9, which is received rotationally fixedly in a receiver 11 in the actuator body or brake piston 7, so that the actuator body/brake piston 7 executes a movement parallel to the longitudinal axis A. Thus the brake piston 7, on which the support point 12 of the threaded nut 9 rests, is also moved. At the same time, the threaded spindle 8 rests on the brake housing 3 via a collar connected to the spindle and an axial bearing. The gear thus converts the rotational motion of the electromechanical actuator into a linear motion, and is responsible for generating both the application force and the release force for performance of a parking brake process. The function of the arrangement, known in principle, is generally disclosed, by way of example, by international patent application WO 2008/037738 A1, and need not therefore be explained further in this context.

The drawings also clearly show a particular set-up of a threaded spindle module 1 according to the embodiments in a pairing with its receiver 11 in a peripheral component (brake piston 7, storage tray TR etc.). A joint is defined between the receiver 11 and the threaded spindle module. The position, i.e. height h2, of a pivot joint axis is substantially defined by a support diameter d between the threaded nut 9 and receiver 11. The technical-physical correlations between the threaded spindle module 1 and the receiver 11 in the storage tray TR or brake piston 7 are substantially influenced by a cone angle α of the support in the brake piston 7, the detailed form of the sphere radius r (roundness/convexity) of the support point 12 on the end face of the threaded nut 9, the height h3 of the center of gravity SP, and the specifically set tribological conditions of roughness, friction and lubrication in the joint. According to the embodiments, the threaded spindle module 1 designed according to the embodiments automatically behaves with inherent stability, i.e. is automatically and autonomously held stable, perpendicular and erect by the prevailing gravitational or weight forces, or is automatically adjusted so as to be perpendicular by the gravity-induced reset property. Thus the threaded spindle module 1 automatically returns to a correct i.e. stable position. In other words, the height h3 of the center of gravity SP of the threaded spindle module 1, relative to its joint or receiver 11, is set as low as possible for the best possible corrective application of the effect of gravity. In its receiver 11, the threaded spindle module 1 to a certain extent behaves in self-righting fashion, like a buoy in a body of water or like a child's toy known as a "tumbler" toy. This monostable design arrangement, with evenly distributed density and without separate additional mass, is also known as a Gömböc. In a supplementary design of the various embodiments of the embodiments, the following additional setting measures have proved particularly suitable, either additionally or in arbitrary combination with each other. 1. The center of gravity SP of the threaded spindle module 1 is offset to a maximum in the direction of the output side. 2. The pivot joint center 16 of the threaded spindle module 1 is offset to a maximum in the direction of the drive side. 3. A pivot radius r of the pivot joint is designed with maximum size. 4. A height of a twist prevention plane h1 is maximized. Also, for tribological reasons, it is recommended to design a cone angle α as large as possible between around 90° and around 150°, and/or to minimize mutual friction as far as possible in alternative ways. For example, for this a particular surface smoothing or roughness depth/surface profiling may be provided in the contact between the support in the receiver 11 and the support point 12 on the threaded nut 9. Alternatively or additionally, the use of a fluid or a fluidic or other lubricant is recommended.

A corresponding final mounting method for motor vehicle brakes 2, which is in principle associated or automatically suitable for protection, specifies that the brake caliper housing 3 with a receiver 11, which is oriented to be vertically open at the top for receiving the threaded spindle module 1, is arranged vertically in a working chamber; that then the threaded spindle module 1 is vertically inserted, axially oriented, into the receiver 11 and lowered such that the drive-side end 14 of the threaded spindle module 1 points vertically upward; and wherein finally the actuator module with its actuator interface pointing vertically downward, perpendicularly and aligned, is lowered from vertically upward to vertically downward onto the peg 10 in order to form, in rational fashion, the rotationally fixed and optionally form-fit coupling of the gear train components.

In one or more embodiments, a self-righting threaded spindle module, in that the threaded spindle module is designed as a convex three-dimensional body with a homogeneous, uniform density distribution, such that the threaded spindle module automatically and autonomously assumes a monostable equilibrium position under force of gravity or as a controlled response to a disturbance variable or an intervention or deflection, and wherein the monostable equilibrium position is wherein the drive-side end of the threaded spindle module is placed vertically at the top and the output-side end of the threaded spindle module is placed vertically at the bottom, oriented vertically one above the other and orthogonal to the horizontal. Accordingly, the threaded spindle module according to the embodiments for the first time incorporates the advantageous, self-righting physical properties in the manner of a capsize-resistant sailing yacht, but with the advantage that there is no need for a separate keel-like ballast. It is the particular benefit of the present embodiments that it applies the mathematical findings of the so-called Gömböc phenomenon for the first time, beneficially, to the requirements of motor vehicle wheel brake technology.

In one or more embodiments, to reinforce the reset effect, it is provided that the threaded spindle module is equipped, with respect to its joint, with a center of gravity which is lowered or sunken in the direction of gravity (i.e. with minimum possible height h3) such that the reset forces on the threaded spindle module are maximized. This gives an accelerated, inherently stable, automatic and autonomous reset, which is centered and aligned to the actuator interface, in relation to the receiver interface. Thus an optimized, autonomous and stable adjustment property is available, so that the threaded spindle module sets itself optimally, automatically and autonomously, in a coaxially centered and aligned fashion. Thus the position of the center of gravity of the threaded spindle module relative to the periphery or receiver is set such that the system automatically centers itself in the manner of a so-called "tumbler toy" and also self-aligns at the correct angle. For the first time, the embodiments allow an important structural contribution to effectively preventing disruptions to an assembly production process or stoppage of an assembly-line, by a threaded spindle module.

The embodiments thus allow a simplified, rational and automated brake production, wherein due to the inherently stable design of the spindle module, at least partially image-processing process control systems or data-processing systems may be omitted. Accordingly, the embodiments also allow a particularly intelligent reduction in the necessary investment, in the case that an automated or worker-supported assembly line for production of particularly economic motor vehicle brake components is to be constructed or operated.

The embodiments related to a threaded spindle gear with system center of gravity arranged along a longitudinal axis, comprising a threaded nut with a convex support interface, the convexity of which induces a theoretical system pivot joint, and comprising a screwed-in threaded spindle and a drive interface on a shaft portion end which is diametrically opposed to a threaded spindle end on the threaded spindle.

The physical-technical set-up, i.e. in particular the ratios and peripheral conditions of the height of center of gravity h2, the contact diameter d, the cone angle α, the convexity or sphere radius r, the cavity i.e. interface arrangement, lubrication and friction influences in the joint etc., are arranged such that the threaded spindle module automatically, under the effect of gravity, achieves the upright or perpendicular position or is held stable in the upright (perpendicular) position. Accordingly, mounting is simplified because for secure and productive mass production, it is merely necessary to ensure a vertical orientation of the brake caliper housing and a vertical insertion of the actuator system.

LIST OF REFERENCE SIGNS

1 Threaded spindle module
2 Motor vehicle brake
3 Brake housing
4 Brake disk
5 Brake pad
6 Brake pad
7 Brake piston
8 Threaded spindle
9 Threaded nut
10 Peg
11 Receiver
12 Support point
13 End (output-side)
14 End (drive-side)
15 External thread
16 Pivot joint center
A Longitudinal axis
Ax Axial direction
α Cone angle
R Radial direction
r Sphere radius
SP Center of gravity
T Tangential direction
TR Storage tray
h1 Twist prevention plane
h2 Height of center of gravity
h3 Height of joint
AE Support plane
d Support diameter

The invention claimed is:

1. A threaded spindle module comprising:
   a threaded spindle which extends along a longitudinal axis and has an external thread at an output-side end and, offset with respect to the external thread, a drive-side end with a peg for rotationally fixed coupling to an actuator interface;
   a threaded nut screwed onto the external thread, wherein a curved support point of the threaded nut contacts the threaded spindle module at a support plane, such that the threaded nut pivots about a pivot center relative to an associated receiver;
   the threaded spindle module has a center of gravity, wherein the threaded spindle module has a convex three-dimensional body with a homogeneous, uniform density distribution, such that the threaded spindle module automatically assumes a monostable equilibrium position under force of gravity or as a controlled response to a disturbance variable or intervention or deflection; and
   wherein the monostable equilibrium position corresponds to the drive-side end of the threaded spindle module placed vertically at the top and the output-side end of the threaded spindle module placed vertically at the bottom, perpendicularly one above the other and aligned with a longitudinal axis, and oriented orthogonally to the horizontally arranged support plane.

2. The threaded spindle module as claimed in claim 1, wherein a lubricant is applied to the pivot.

3. The threaded spindle module as claimed in claim 1, wherein the threaded nut serves as the joint of the threaded spindle module for at least one of a transport display, storage tray, and brake piston.

4. The threaded spindle module as claimed in claim 1, further comprising a cone angle of the support plane in the position, wherein the cone angle is greater than 90°, and wherein the cone angle does not exceed a predefined maximum value.

5. The threaded spindle module as claimed in claim 4, wherein the predefined maximum value of the cone angle is 150°.

6. The threaded spindle module as claimed in claim 1, wherein the center of gravity of the threaded spindle module is offset on the output side, and wherein a distance between the center of gravity and the support point is the same as or shorter than a distance between the pivot center and the support point so that the threaded spindle module centers to the monostable equilibrium position relative to the receiver.

7. The threaded spindle module as claimed in claim 6, wherein the center of gravity of the threaded spindle module is offset in the direction of the output side.

8. The threaded spindle module as claimed in claim 6, wherein the contact between the curved support point and the support plane is at a point that results in a maximum offset of the pivot center in the direction of the drive side.

9. The threaded spindle module as claimed in claim 6, wherein the contact between the curved support point and the support plane is at a point that results in a maximum pivot radius of the pivot.

10. The threaded spindle module as claimed in claim 6, wherein a defined structural size ratio of a support diameter to a height of center of gravity to pivot is between 0.7 and 2.2 is provided.

11. A method for final mounting of a motor vehicle brake comprising:
    a brake housing;
    an actuator module;
    a threaded spindle module with the features of one or more of the preceding claims;
    wherein the brake housing is arranged vertically in a working chamber with a receiver which is open vertically at the top for receiving the threaded spindle module;
    wherein then the threaded spindle module is inserted into the receiver vertically with axial orientation and is lowered such that the drive-side end of the threaded spindle module points vertically upward; and
    wherein finally the actuator module with the actuator interface pointing vertically downward, perpendicularly and aligned, is lowered from vertically upward to vertically downward so as to rotationally fixedly connect the latter to the threaded spindle.

* * * * *